United States Patent [19]
Horner

[11] 3,742,221
[45] June 26, 1973

[54] INTENSITY CONTROL CIRCUIT FOR VISUAL APPROACH SLOPE INDICATOR INSTALLATION

[75] Inventor: Robert H. Horner, Huntington Beach, Calif.

[73] Assignee: Hughey and Phillips, Inc., Burbank, Calif.

[22] Filed: Nov. 15, 1971

[21] Appl. No.: 198,506

[52] U.S. Cl................. 250/206, 250/214, 315/149
[51] Int. Cl............................................. H01j 39/12
[58] Field of Search................... 250/217, 206, 214; 317/124; 315/149, 156, 157, 159, 158; 307/311

[56] References Cited
UNITED STATES PATENTS

| | | |
|---|---|---|
| 3,286,097 | 11/1966 | Norwood ............................. 250/206 |
| 3,383,552 | 5/1968 | Brock ................................. 250/206 |
| 3,500,456 | 3/1970 | Ross..................................... 315/149 |
| 3,538,336 | 11/1970 | Niedzielski.......................... 250/206 |
| 3,636,404 | 1/1972 | Appleton ............................ 250/206 |

Primary Examiner—James W. Lawrence
Assistant Examiner—D. C. Nelms
Attorney—Bruce L. Birchard

[57] ABSTRACT

An improved light intensity control circuit for visual approach slope indicator (VASI) installations at airports is described which gives a continuously adjustable control of the VASI light intensity for two separate sets of operation; day operation and night operation; with low heat generation and long life in the control circuit.

7 Claims, 1 Drawing Figure

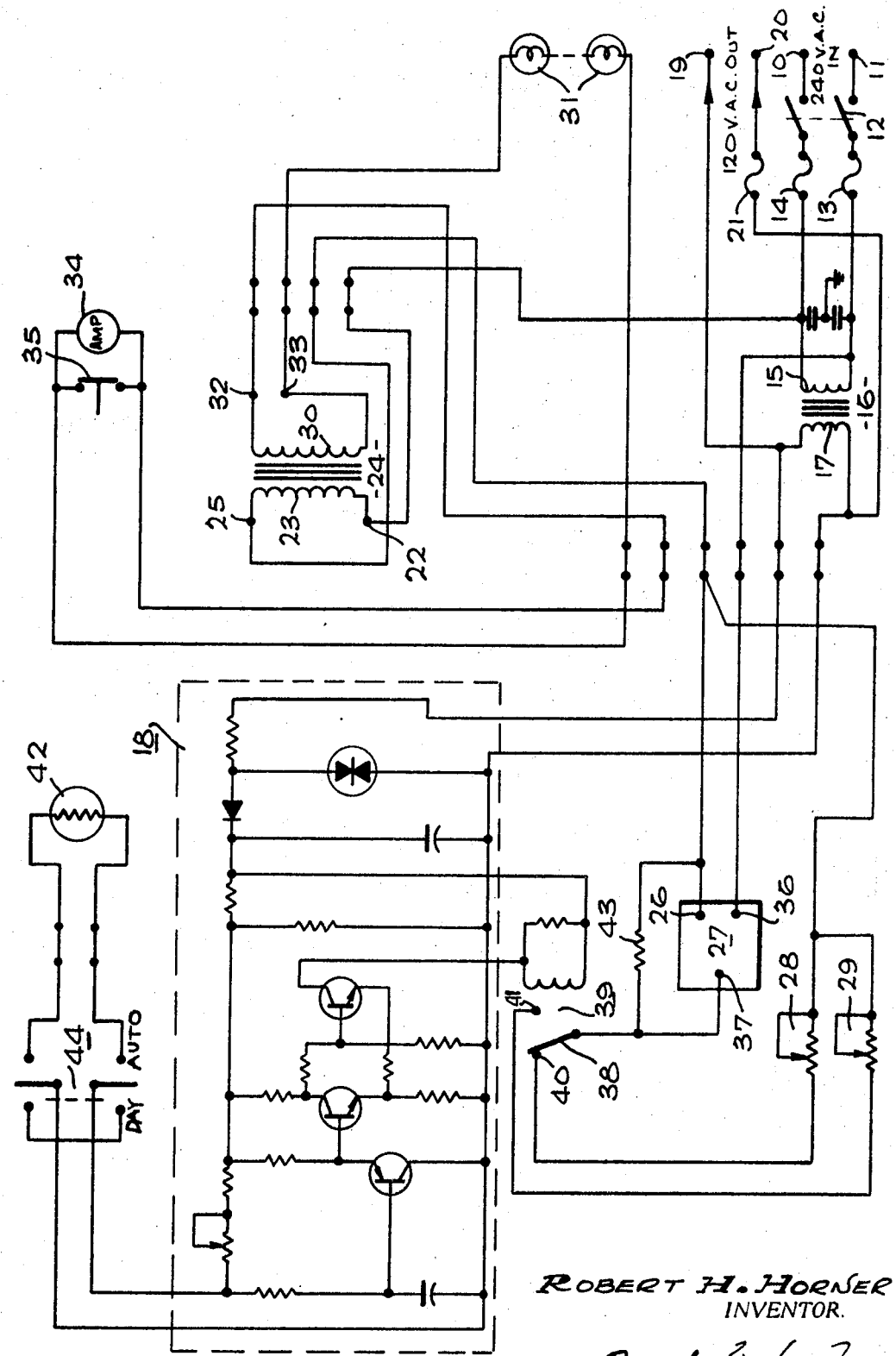

INTENSITY CONTROL CIRCUIT FOR VISUAL APPROACH SLOPE INDICATOR INSTALLATION

RELEVANT COPENDING APPLICATION

Application Ser. No. 198,509 filed Nov. 15, 1971 and entitled Safety System for Visual Approach Slope Indicators.

BACKGROUND OF THE INVENTION

To maintain and improve the high standards of safety in the aeronautics industry of the United States the Federal Avition Agency, which is charged with the safety of air travel in the United States, has approved and required the installation of an aircraft approach system designated by the acronym VASI. VASI stands for Visual Approach Slope Indicator. It is a visual system supplementing ILS (Instrument Landing System) for those aircraft equipped with ILS receivers and indicators and supplying an accurate slope indicator for those aircraft, usually the privately owned aircraft, having no electronic landing approach slope indicating equipment. For the smaller airports with limited traffic an alternative but related system called SAVASI is available. The first two letters of that acronym stand for Simple Abbreviated.

The principle of operation of VASI and SAVASI, although not directly part of this invention requires some explanation to appreciate the full import of the invention claimed herein. The full details of VASI can be found in Handbook 6850.2 published by the Federal Aviation Administration, U.S. Department of Transportation. In its simplest form two light sources (called "bars") are located adjacent to but at a safe distance from the center line of the runway to be used and are spaced along the runway at critical distances to be described. The bar nearest the landing threshold of the runway is called the "downwind" bar, and that further along the runway is described as the "upwind" bar.

Each bar contains three 200 watt 6.6 ampere prefocussed halogen cycle lamps and three sets of red and white spread lenses which produce well defined red and white beams of light having known half-power widths in the vertical plane and in the horizontal plane. For example, the half-power width of the vertical radiation pattern for the white beam is approximately 2°. The crossover point between the white and red beams is also pre-determined and set with great accuracy.

The white beam lies above the red beam in both the upwind and downwind light bars. This is achieved by the spread lens filter in front of each lamp in the light bar. The upper portion of each such lens is red and the lower portion is clear. The lenses also spread the light horizontally.

In addition to the critical location of the upwind and downwind bars along the runway the aiming of these bars is critical. As has been noted the light beams are narrow and in order to provide a safe glide slope path that can be relied upon by a pilot making a landing approach the corridor must be accurately defined.

When the positioning and aiming of the light bars are correct and the pilot is on the right glide path the downwind bar or bars will appear white while the upwind bars appear red. If the approach is too high, both downwind and upwind bars appear white, while an approach which is too low results in both bars appearing red.

To prolong the life of the VASI lamps it is desirable to reduce the current through them at night from the 6.6 amperes established in the daytime to approximately 4.5 amperes. Because of the low ambient light at night the pilot can still successfully utilize a two box VASI installation from a point as far as 3 nautical miles from the airport despite the lamp current reduction.

The previous approach to reducing VASI lamp current at night is described in Handbook 6850.2 published by the FAA, Chapter 5, Section 1 subsection 102 at page 59, as follows: "The VASI-2 is powered from a power and control assembly consisting of a 3 KVA transformer, photoelectric device, and associated control contactors. Power input is 120/240 volts, single phase. The transformer has 3–2½ percent taps above and below normal on the input side to be used for adjustment of the input voltage. These taps may also be used, when necessary, to aid in adjusting the output current to the light boxes. The rated output of the power and control assembly is 140/280 volts for the top brightness step and 70/140 volts for the low brightness step. These two voltage steps provide relative brightness steps of 100 percent and 10 percent. Brightness step changes are made automatically by a photoelectric control by switching taps on the secondary of the 3 KVA transformer. Rheostats are provided in the power and control assembly for adjusting output current to the light units".

With such an arrangement only gross adjustments can be made in the current to the VASI lamps and selective continuous adjustment of daytime and nighttime light levels is impossible. Further, the rheostats referred to generate large quantities of heat which cause deterioration of the equipment and wiring encased in the same housing as the rheostats.

In the light intensity control system which constitutes the present invention an untapped power transformer is utilized. A phase controlled solid state power module is inserted between the source of lamp power and the primary of lamp power transformer. The R. M. S. value of the current flowing to the primary of the power transformer is controlled by the power module which, in turn, is controlled, alternatively, by a "night current" potentiometer or a "day current" potentiometer depending on the automatic action of a photocell activated switch which inserts one or the other of the potentiometers in the power module control circuit. Continuous adjustment of the VASI lamp current for daytime or nighttime operation is thus achieved for optimum VASI lamp life and without any deleterious heat generation which was characteristic of prior art devices.

BRIEF DESCRIPTION OF THE DRAWING

The Drawing is a schematic diagram of a VASI lamp light intensity control circuit according to the present invention.

DETAILED DESCRIPTION OF THE ILLUSTRATED EMBODIMENT

In the Drawing, terminals 10 and 11 are adapted for the application of 240 volts A.C., single-phase power thereto. Terminals 10 and 11 are coupled through main power switch 12 and fuses 13 and 14 to the primary winding 15 of step-down transformer 16. The secondary winding 17 of transformer 16 supplies operating power to photocell amplifier 18 which is described in detail in U.S. Pat. No. 3,231,787 issued to Clarence B. Knudson and assigned to the same assignee as this application. Secondary winding 17 also supplies 120 volts, single-phase A. C. power to terminals 19 and 20 through fuse 21. This power can be used to operate associated equipment in the VASI installation, for example, the tilt sensing module described in co-pending application Ser. No. 198,509 entitled SAFETY SYSTEM FOR VISUAL APPROACH SLOPE INDICATORS.

Terminal 10 is also connected to one terminal 22 of primary winding 23 on transformer 24. The remaining terminal 25 of primary 23 is connected to output terminal 26 of power control module 27. Power control module 27 incorporates solid state devices such as silicon controlled rectifiers (SCR's), A. C. semiconductor switches or variations thereof which have the characteristic of passing portions of an applied sine wave dependent upon the magnitude of associated control elements such as, in this case, potentiometers 28 and 29, respectively. One form of such A. C. power control circuits is described in General Electric Bulletin 155.22 entitled *Extended Range Variable Voltage Circuit* issued by the Semiconductor Products Department of that company. The firing point of the semiconductor device (in the G. E. case called a "Triac") can be varied, alternatively, by potentiometers 28 and 29 and, hence, the R. M. S. value of the current flowing in primary 23, and, consequently, the voltage induced in secondary 30 across terminals 32 and 33 and applied to VASI lamps 31 can be adjusted. Ammeter 34, shunted by test switch 35, is interposed between secondary terminal 32 and VASI lamps 31 for purposes which will be described in connection with the operation of this invention.

Input terminal 36 of power module 27 is connected to power input terminal 11, thus completing the circuit for application of power to primary winding 23 through power module 27.

Control terminal 37 of power module 27 is connected to the movable contact element 38 of photocell operated relay 39 having fixed contacts 40 and 41. Photocell 42 may be of cadmium sulfide variety and is positioned to sense the average natural illumination in the airport runway area and supply a "day"-"night" control signal to amplifier 18 and hence to relay 39. Relay 39 is shown in the position it assumes at night with movable contact 38 connected to fixed contact 40, thus connecting control module 27 to night potentiometer 28. Fixed contact 41 is connected to day potentiometer 29. Resistor 43 shunts switch 39 so that control terminal does not "float" during the switching process. Set-up switch 44 permits simulating daytime and night-time conditions during VASI installation adjustment and maintenance procedures. Of course, relay 39 may be replaced by an equivalent solid state device or circuit.

The operation of the circuit of FIG. 1 is as follows. With the closure of switch 12, 240 volt, single phase A.C. power is applied between terminal 36 of power module 27 and terminal 22 of primary 23. Simultaneously, operating power for photocell amplifier 18 is derived from secondary 17 of step-down transformer 16. With set-up switch 44 in the position shown movable contact 38 is in closed relation with fixed contact 40 and potentiometer 28 is connected in a controlling position between control terminal 37 and output terminal 26. Test switch 35 is then depressed placing ammeter 34 in series with the circuit to VASI lamps 31. Potentiometer 28 is then adjusted until the current flowing to lamps 31 is approximately 4.5 amperes. Any other value up to full intensity and approaching zero may be achieved by adjustment of potentiometer 28, which for safety purposes is a screwdriver adjustment. Set-up switch 44 is then turned to its day position which connects potentiometer 29 in the controlling position between terminals 37 and 26 of power control module 27. Test switch 35 is again depressed and potentiometer 29 is adjusted until ammeter 34 shows a flow of 6.6 amperes through VASI lamps 31. Test switch 35 is then released and set-up switch 44 is turned to the "Auto" position and the light intensity system will now be automatically controlled by incident light photocell 42. Amplifier 18 is adjusted to pull movable contact 38 of relay 39 into contact with contact 41 when the ambient light level is 58 foot candles and to release contact 38 so that it connects with contact 40 when the ambient light level falls below 35 foot candles. During the day potentiometer 29 will automatically be switched to the controlling connection with respect to power control module 27. At night, potentiometer 28 will automatically be switched to that controlling position. The result is a system which permits pre-setting over a continuous range and automatic selection of the light intensity from VASI lamps 31 with minimum heat generation and its deleterious effects on associated equipment.

While a specific embodiment has been described, modifications may be made within the scope of the invention. The following claims are intended to cover such embodiments.

What is claimed is:

1. A continuously adjustable light intensity control circuit for lamps in visual approach slope indicator system including: a first set of terminals adapted for the application of a predetermined potential thereto; a set of slope indicator lamps having a set of input terminals; power control means coupled to said first set of terminals and to said input terminals of said set of slope indicator lamps, said power control means having a control terminal and a second terminal and being responsive to the resistance between said control terminal and said second terminal to determine the potential applied to said input terminals of said set of slope indicator lamps; first and second continuously adjustable resistances; and photocell means responsive to first and second light levels to switch said first continuously adjustable resistance and said second continuously variable resistance, respectively and separately, into connection between said control and second terminals of said power control means.

2. Apparatus according to claim 1 in which said continuously adjustable resistances have selected values which produce across said input terminals of said slope indicator lamps potentials which produce a current for daytime operation and a current for nightime operation corresponding to said first and second light levels, respectively.

3. Apparatus according to claim 1 in which said power control means includes an A. C. semiconductor switch.

4. Apparatus according to claim 1 in which said power control means includes an A. C. semiconductor switch having an input terminal and output terminal and a control terminal; said first adjustable resistance and said second adjustable resistance being selectively and separately switched by said photocell means into connection between said control terminal and said output terminal.

5. Apparatus according to claim 1 in which said photocell means include a cadmium sulfide photocell, an adjustable amplifier and a single pole, double throw switch for selectively and separately connecting said first variable resistance and said second variable resistance between said control and second terminals of said power control means; said power control means including a semiconductor device which conducts A. C. on portions of the A. C. cycle determined by said first and second adjustable resistances, respectively.

6. Apparatus according to claim 5 in which said power control means includes a transformer.

7. Apparatus according to claim 2 in which said current for daytime operation approximates 6.6 amperes and said current for daytime operation approximates 4.8 amperes.

* * * * *